United States Patent [19]

Claxton et al.

[11] Patent Number: 5,074,108
[45] Date of Patent: Dec. 24, 1991

[54] FRUIT HARVESTING MACHINE

[75] Inventors: Gerald L. Claxton, Fresno; Kenneth R. Penfold, Kingsbury, both of Calif.

[73] Assignee: American Grape Harvesters, Inc., Selma, Calif.

[21] Appl. No.: 566,111

[22] Filed: Aug. 13, 1990

[51] Int. Cl.$^5$ ..................... A01D 46/26; A01D 46/28
[52] U.S. Cl. ..................... 56/330; 56/340.1
[58] Field of Search .......... 56/1, 330, 340.1, DIG. 15, 56/DIG. 19

[56] References Cited

U.S. PATENT DOCUMENTS

| | | | |
|---|---|---|---|
| 4,172,352 | 10/1979 | McCarthy et al. | 56/330 X |
| 4,198,801 | 4/1980 | Claxton | 56/1 |
| 4,286,426 | 9/1981 | Orlando et al. | 56/330 |
| 4,391,085 | 7/1983 | Harris et al. | 56/330 |
| 4,621,488 | 11/1986 | Claxton | 56/340.1 X |

*Primary Examiner*—David J. Bagnell
*Attorney, Agent, or Firm*—James F. Mitchell

[57] ABSTRACT

A grape harvesting picking head is provided having a pair of C-shaped arms which are each independently pivotally suspended at their upper ends. A reaction mass which forms the drive system carries a pair of cranks which drive a pair of connecting rods which are connected to each of the C-shaped arms. The cranks have a large throw relative to the length of the connecting rods, so that relative motion occurs between the shaker rails carried at the lower ends of the C-shaped arms, the relative motion causing a "snapping" action to help harvest the grapes. The distance between shaker rails is automatically adjusted "on the fly," the adjustment being facilitated by two halves of the picking head being free to articulate about a central axis and providing a hydraulic cylinder between these two sections of the picking head which balances the weight of the two sections and allows the two sections to float relative to each other as the machine moves down the row of plants.

7 Claims, 7 Drawing Sheets

FRUIT HARVESTING MACHINE

BRIEF SUMMARY OF THE INVENTION

This invention relates to harvesting machines in general and in particular to a grape harvesting machine. More particularly, the invention relates to a vibratory picking head which is suspended from a harvesting machine which straddles and moves along a row of grapevines. The picking head utilizes a pair of shaker rails which are adapted to impact the sides of the trunks of the grapevines as the harvesting machine moves along a row of vines.

The prior art grape harvesting machines which use shaker rails generally use a pair of support arms for the shaker rails wherein the support arms are oscillated as a unit so that the distance between shaker rails stays fixed during the operation of the machine. Prior art shaker rail machines of this type include McCarthy U.S. Pat. No. 4,172,352, Claxton U.S. Pat. No. 4,621,488 and Orlando U.S. Pat. No. 4,286,426.

Another feature typically used by prior art shaker rail grape harvesters is a hydraulic cylinder between shaker rail support arms which is used to adjust the distance between the shaker rails. The distance between shaker rails is adjusted by the operator of the machine, for example, to narrow the distance between rails for younger and thinner vines and to increase the distance between rails to clear supporting posts at the ends of each row of vines. The prior art patents noted above teaches cylinders for adjusting the distance between shaker rails.

The present invention provides an arrangement wherein the support arms for the shaker rails are suspended so that each arm is free to pivot independently of the other arm. A fixed displacement crank drive is provided wherein the cranks have a relatively large throw compared to the lengths of the connecting rods so that a non-sinusoidal motion is imparted to each rail so that relative motion occurs between the shaker rails. The relative motion between the shaker rails is such that the distance between shaker rails is greater at bottom dead center than at either of the extreme positions of the shaker rails. The result is an increased snapping action at each extreme position of the rails which increases the overall picking efficiency of the machine.

The present invention also provides a picking head wherein both halves of the picking head are free to articulate around a central axis and wherein a pressure cylinder is provided between the two portions of the picking head so that the distance between the shaker rails is adjusted automatically "on the fly."

The primary object of the invention is to provide a grape harvesting machine wherein relative motion between the shaker rails is utilized to obtain an increased snapping action at each extreme position of the shaker rails to increase the picking efficiency of the machine.

Another primary object of the invention is to provide a shaker rail grape harvester wherein the distance between the shaker rails is automatically adjusted "on the fly."

A further object of the invention is to provide a shaker rail harvester wherein each shaker rail moves in a non-sinusoidal pattern wherein the acceleration at one extreme position is substantially greater for each shaker rail than its acceleration at its other extreme position.

A further object of the invention is to provide a shaker rail harvester wherein a "soft hand-off" of the grapevine is made from one shaker rail to the other shaker rail.

A further object of the invention is to provide a shaker rail grape harvester wherein a suspension cradle and a pair of spring mounts are used to isolate vibrations generated in the picking head from the harvester frame.

Other objects and advantages of the invention will become apparent from the following description of the preferred embodiment and the drawings wherein:

DETAILED DESCRIPTION OF THE DRAWINGS

Figure 1:
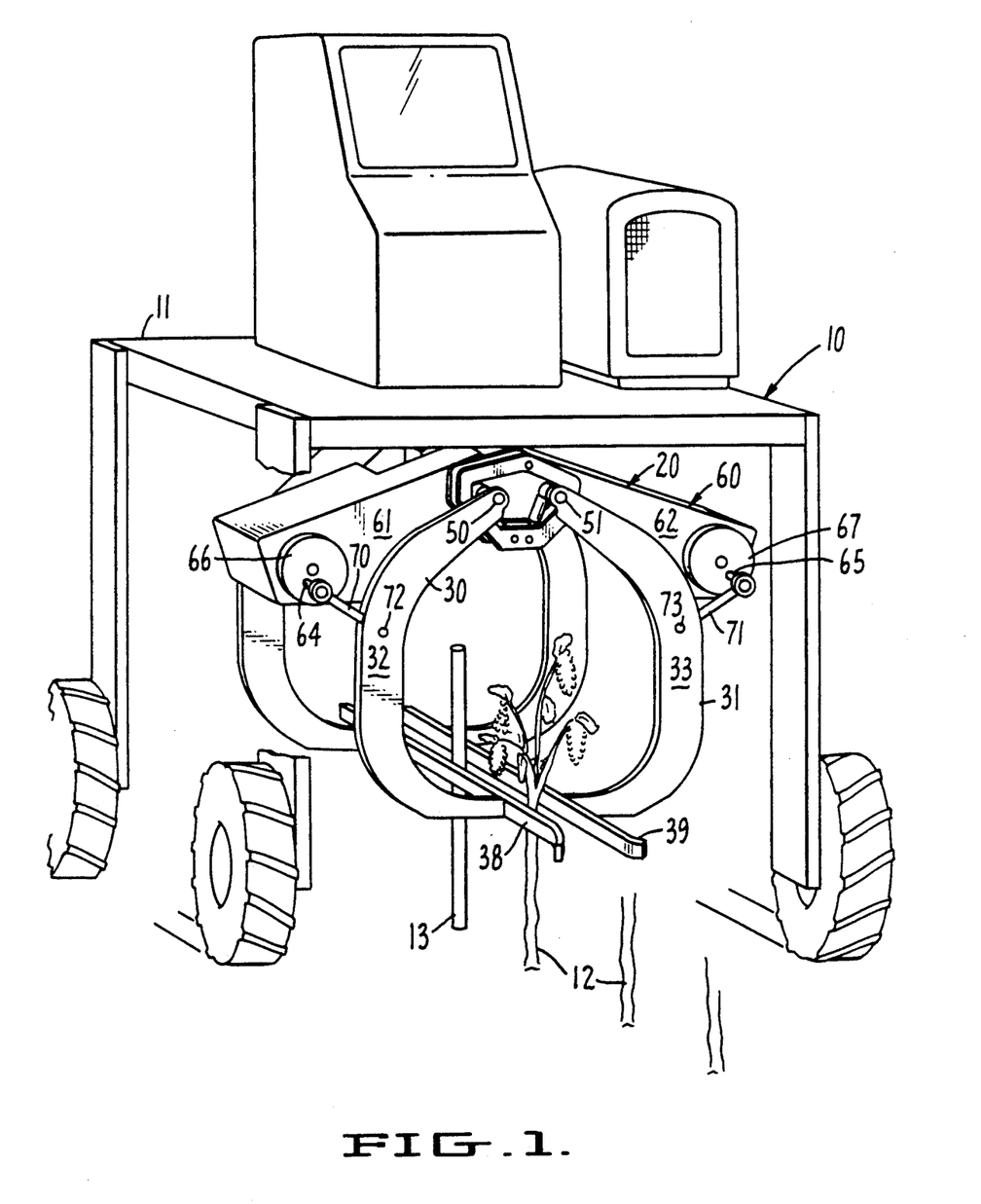
FIG. 1 is a perspective view, partially broken away, of a grape harvesting machine according to the present invention.

Referring to the drawings, a grape harvester shown generally as 10 has a wheeled main frame 11 adapted to straddle and move along a row of grapevines 12 which have vertical trunks spaced along the row. Trellis posts 13 are spaced apart along the row.

Figure 2:
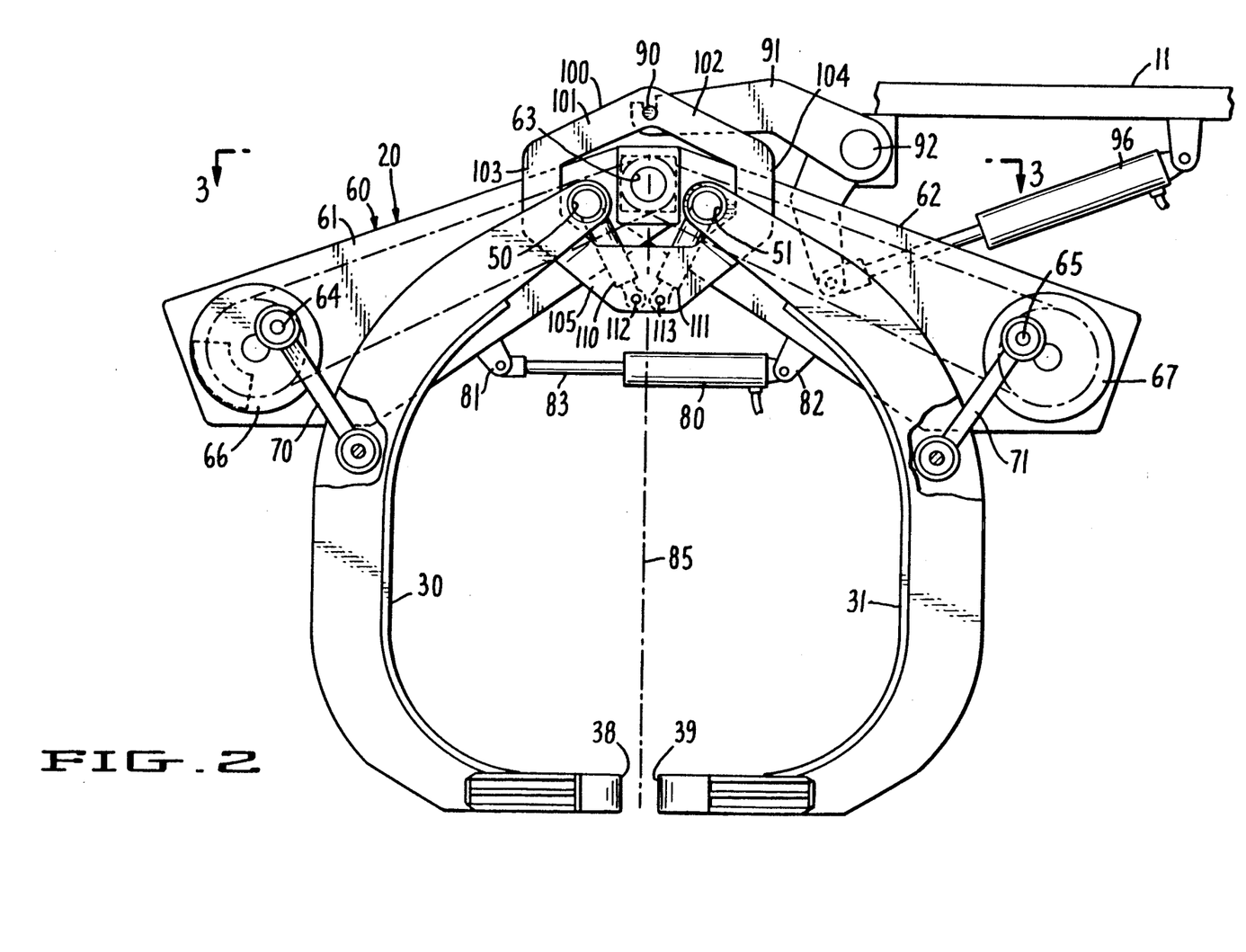
FIG. 2 is a front elevation of a picking head in accordance with the present invention.

A vibratory picking head shown generally as 20 is suspended from harvester frame 11 as will be described in greater detail below. A pair of downwardly depending C-shaped arms 30 and 31 are provided, each being pivotally suspended at its upper end at pins 50 and 51 whereby each arm 30 and 31 is free to pivot about pins 50 and 51 independently of the other arm.

Shaker rails 38 and 39 are carried at the lower ends of arms 30 and 31.

Drive means shown generally as 60 comprises a first portion 61 and a second portion 62 (see FIG. 4) which form an inverted V shape and which are each free to pivot about drive shaft 63 (FIG. 2) located at the top of the inverted V. Drive means 60 forms a reaction mass against which arms 30 and 31 are driven. Drive means 60 includes a pair of cranks 64 and 65 which are carried by flywheels 66 and 67, respectively. Flywheels 66 and 67 are mounted to portions 61 and 62 of drive means 60 such that each flywheel is above and outboard of the center portions 32 and 33 of arms 30 and 31, respectively. Cranks 64 and 65 drive connecting rods 70 and 71. Connecting rods 70 and 71 are pivotally attached to the central portions of C-shaped arms 30 and 31 by connecting pins 72 and 73.

Figure 4:
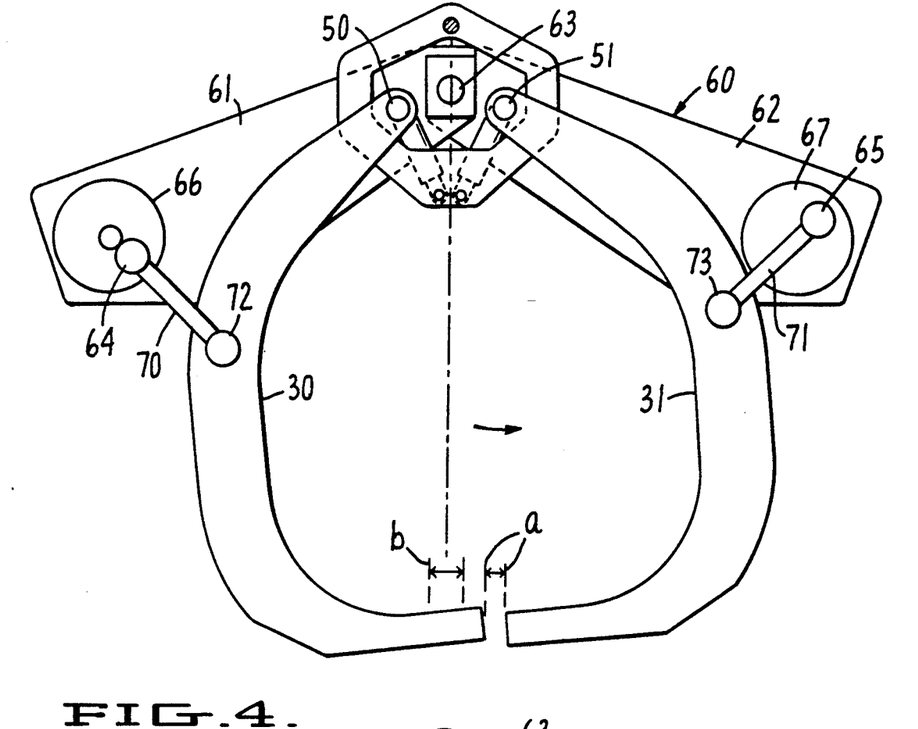
FIG. 4 is a schematic representation showing the relative motion be shaker rails.
Figure 5:
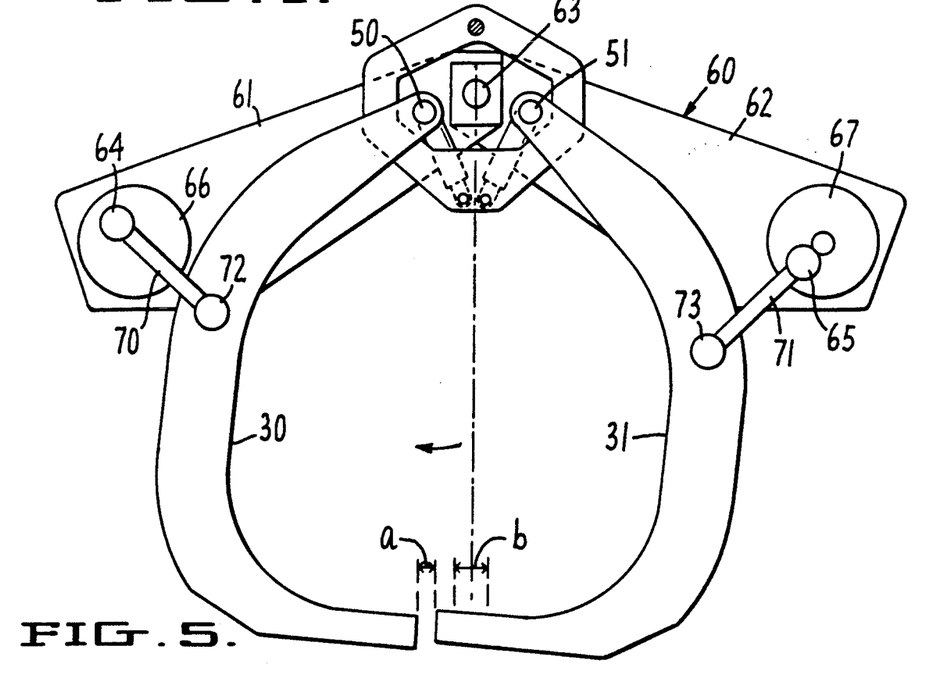
FIG. 5 is a schematic representation which also shows relative motion of the shaker rails of the present invention.

As shown best in FIGS. 4 and 5, relative motion occurs between the shaker rails (shaker rails not shown in FIG. 4 for clarity) which are mounted at the lower portion of arms 30 and 31. In FIG. 4, arms 30 and 31 are shown in their extreme righthand position with a distance a between rails and a greater distance b between rails shown at the bottom dead center position. FIG. 5 shows arms 30 and 31 at the extreme lefthand position wherein distance a is shown between shaker rails and wherein distance b is shown as the distance between shaker rails at the bottom dead center position.

Figure 8:
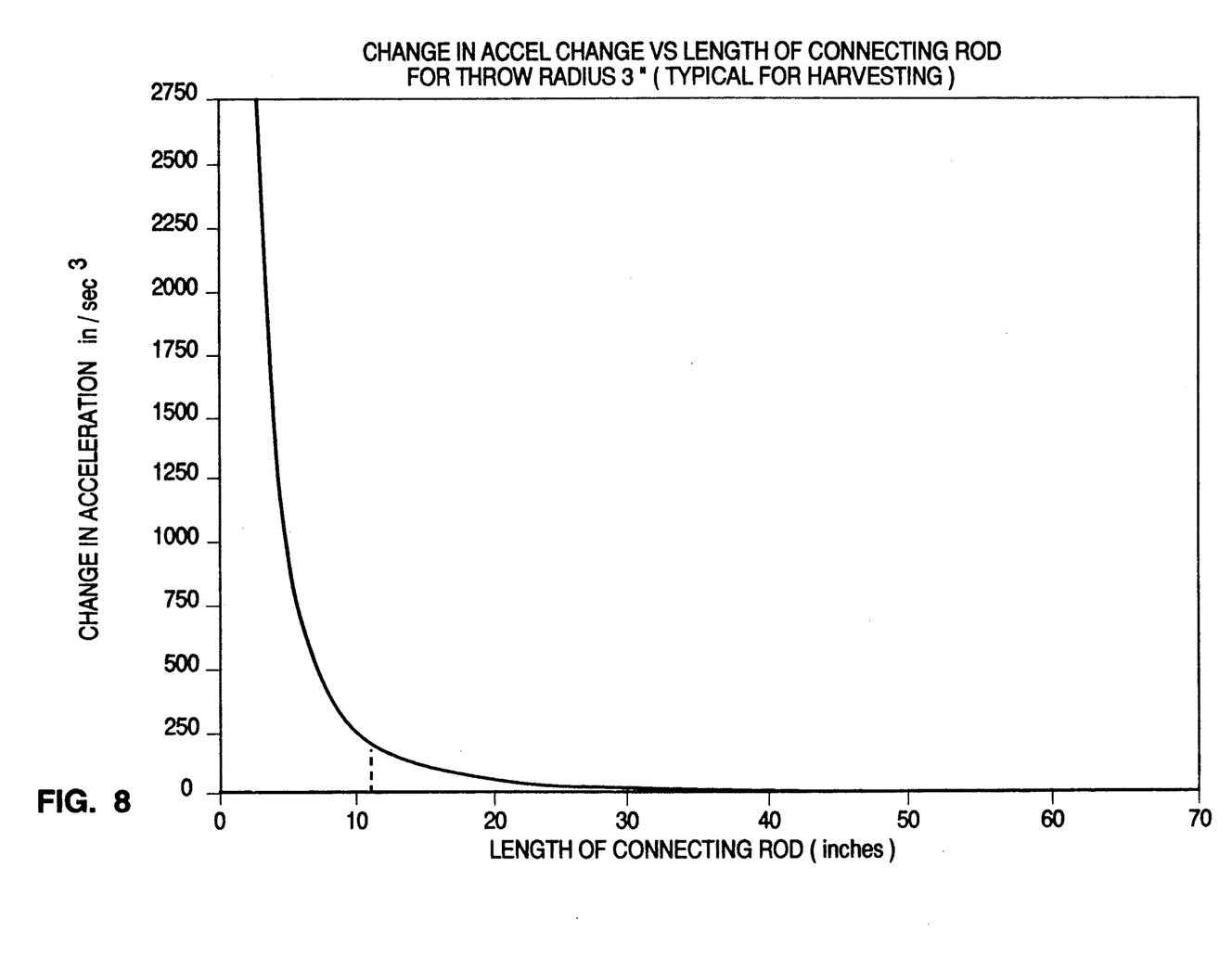
FIG. 8 is a graphical representation differentiating the large throw crank drive of the present invention from the sinusoidal drives of the prior art.

This relative motion between shaker rails 38 and 39 is facilitated by the independent pivotal mounting of arms 30 and 31 at pins 50 and 51 and by the use of drive cranks 64 and 65 wherein the throw of the cranks is relatively large when compared with the length of the connecting rods 70 and 71. For example, in the embodiment shown, the "throw" or radius of the circle through which crank 64 moves is 3 inches and the length of connecting rod 70 (from the center of crank 64 to the center of pin 72) is 12 inches. This relatively short connecting rod when length compared to the crank throw causes non-sinusoidal motion of pins 72 and 73 and also non-sinusoidal motion of shaker rails 38 and 39 carried at the lower portion of arms 30 and 31. FIG. 8 is a graphical representation of the change in acceleration for a given crank throw for different lengths of connecting rods. The horizontal axis of FIG. 8 represents the connecting rod length in inches and the vertical axis represents the change in acceleration of the driven ends 72, 73 of connecting rods for a fixed crank throw of 3 inches (typical of harvesting operations). This change in acceleration is an indicator of the amount of "snap" or "jerk" present in the motion of the shaker rail. FIG. 8 also represents those crank driven systems where the connecting rods are very long relative to the crank throw (i.e. those locations on FIG. 8 where L is greater than 20 inches), in which the change in acceleration is essentially zero. However, where the connecting rod length drops below about 15 inches (for a fixed crank throw of 3 inches), the change in acceleration increases dramatically. For example, the dashed line at L=12 represents the preferred embodiment of this invention wherein the connecting rod length is 12 inches and the crank throw is 3 inches. For this geometry, the increased acceleration is approximately 200 in/sec³.

Figure 6:
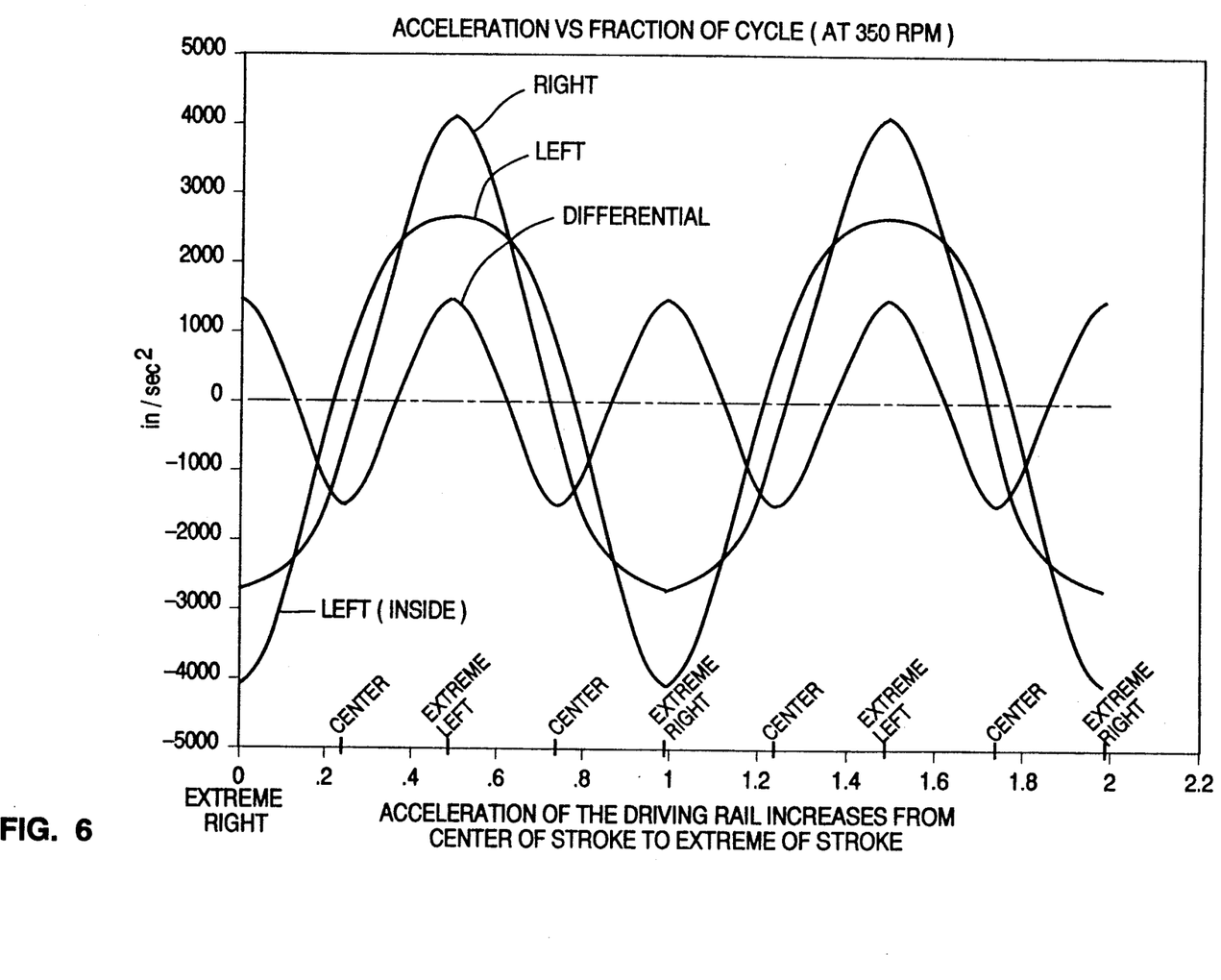
FIG. 6 is a graphical representation of the relative motion between shaker rails of the present invention.

FIG. 4 shows schematically the "driving" rail 38, i.e. the rail mounted on arm 30 at its point of greatest acceleration, at the very end of its driving stroke. Conversely, FIG. 5 shows the position wherein the driving rail 39 carried by arm 31 is at its extreme position and is at its point of maximum acceleration. The accelerations of the rails are shown in FIG. 6. FIG. 6 is a graphical representation showing that, for the extreme righthand motion of the picking head shown in FIG. 4, the acceleration of the left rail 38 (also the "driving" rail or "inside" rail) is about −4,000 in/sec². FIG. 6 also shows that, at the extreme righthand motion shown in FIG. 4, the acceleration of rail 39 carried by arm 31 is approximately −2700 in/sec². As shown in FIG. 6, the other extreme position is shown along the horizontal axis at 0.5 fraction of cycle, which corresponds to the position shown in FIG. 5 of the drawings. At this position, the righthand rail 39 carried by arm 31 is shown at its position of maximum acceleration which occurs at the extreme lefthand motion of the apparatus. At this position, the acceleration of rail 39 is approximately 4,000 in/sec². The acceleration of the righthand rail at this extreme position, therefore, exceeds the acceleration of that rail at its other extreme position by more than 30%. We have found that it is advantageous to design the geometry of the crank throw and connecting rod to achieve at least a 30% differential in accelerations for a given rail from one extreme position of the cycle to the other extreme position of the cycle. These differential accelerations are achieved by utilizing a crank throw which exceeds 20% of the length of the connecting rods 70 and 71. We have found that for a crank throw of 2½ to 3 inches, it is preferred to use a connecting rod of from 11½ to 12 inches in length. FIG. 6 was derived using a crank throw of 2½ inches and a connecting rod length of 11.75 inches.

Figure 7:
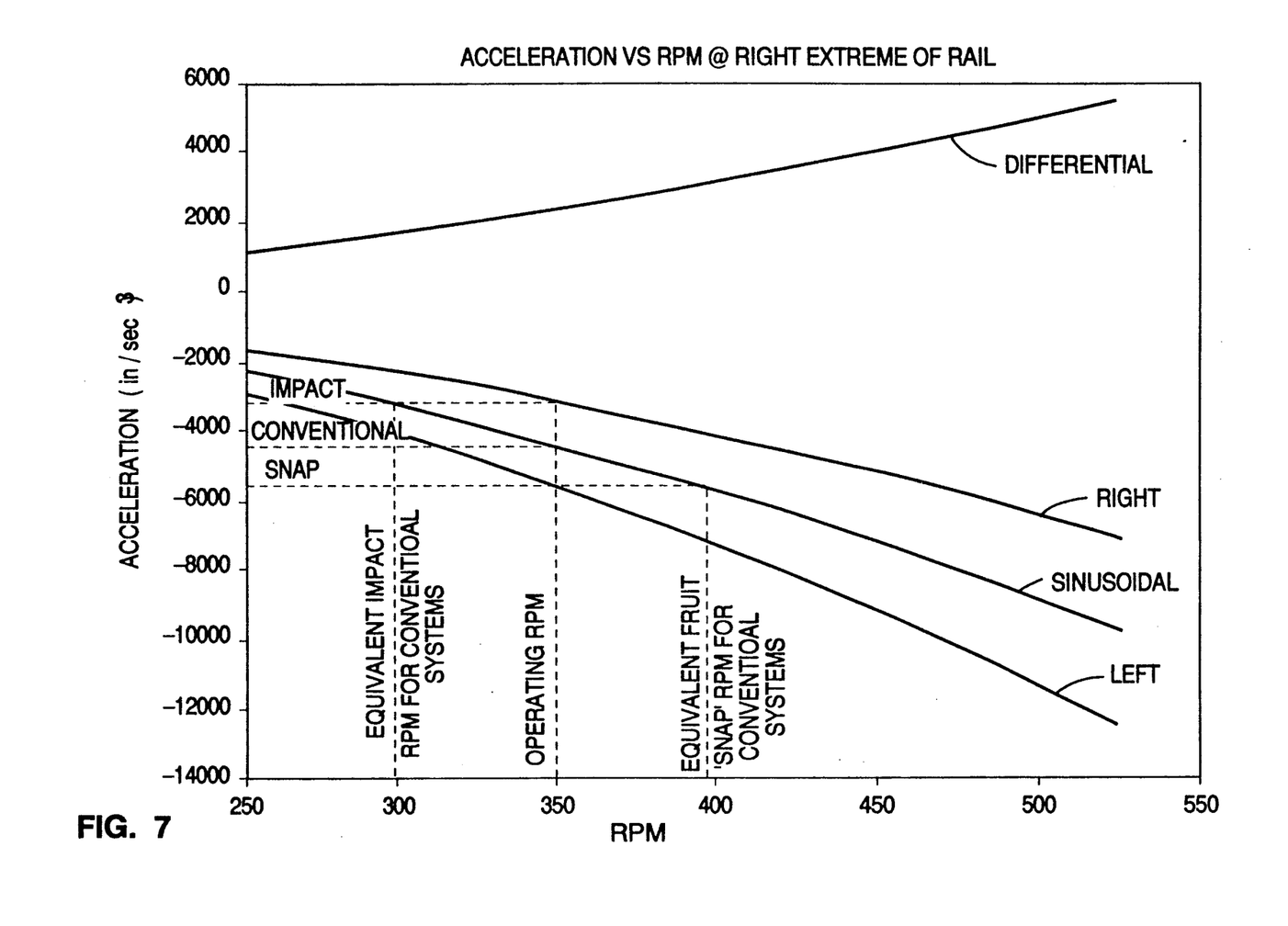
FIG. 7 is a graphical representation of the increased picking efficiency of the picking head of the present invention compared to sinusoidal picking heads of the prior art.

FIG. 7 is a graphical representation which shows how increased rpm increases the acceleration of both rails at the extreme righthand motion as shown in FIG. 4. In FIG. 7, referring to 350 rpm, the large negative acceleration shown for the lefthand rail of the present invention is simply not achieved by the sinusoidal systems of the prior art at the same rpm. To achieve the acceleration of the lefthand rail of the present invention in a sinusoidal prior art mechanism, the rpm of the machine would have to be increased to approximately 400 rpm. The disadvantage of increasing the rpm is increased damage to the vine and to the posts and wires supporting the vine. FIG. 7, thus, demonstrates the increased picking efficiency of the present invention as compared with the sinusoidal motions of prior art machines.

As shown best in FIG. 2, pressure cylinder 80 extends between ear 81 carried by the first portion 61 of drive means 60 and ear 82 carried by the second portion 62 of drive means 60. Pressure cylinder 80 is not connected to arms 30 and 31. Pressure cylinder 80 may be driven by either hydraulic or pneumatic pressure. In the preferred embodiment, pressure cylinder 80 is driven by hydraulic fluid and cylinder 80 is pressurized to the point where it nearly balances the weight of all components in FIG. 2 to the lefthand side of center line 85 tending to drive shaker rail towards center line 85, as well as the weight of all items to the right of center line 85 in FIG. 2 tending to drive shaker rail 39 towards center line 85. Therefore, in the position shown in FIG. 2, with cylinder 80 pressurized, the system is balanced, so that if pressure is exerted between shaker rails 38 and 39, as for example by a thick trunk of a grapevine or by a trellis post, the increased pressure between shaker rails 38 and 39 will automatically spread shaker rails 38 and 39 and extend rod 83 outwardly from cylinder 80. As a practical matter, in the field, cylinder 80 is set just slightly below the balance point so that shaker rails 38 and 39 tend to come together. Therefore, when the harvesting machine moves past an end post of relatively great thickness and moves onto a grapevine with relatively thin trunks, shaker rails 38 and 39 tend to move closer together and do so automatically. Thus, in operation, the operator of the harvesting machine does not have to manually set or adjust the distance between shaker rails 38 and 39 in normal operation of the harvester. The distance between shaker rails 38 and 39 adjusts automatically "on the fly."

The suspension of the picking head is shown best in FIG. 2. The entire weight of picking head 20 is borne by suspension cradle 100 which transfers the weight to pin 90 which in turn is supported by bell crank 91 which is suspended from pin 92 anchored to harvester frame 11. Bell crank 91 is driven by pressure cylinder 96 to adjust the vertical height of shaker rails 38 and 39 from the ground.

Suspension cradle 100 comprises a generally pentagonal frame which has upper arms 101 and 102, side arms 103 and 104 and a lower support arm 105. Suspension cradle 100 is pivotally attached to harvester frame through pin 90 located at the intersection of upper arms 101 and 102. The weight of the drive means 60 and arms 30 and 31 is borne by mounting springs 110 and 111 which are pivotally connected to the base portion 105 of suspension cradle 100 by pins 112 and 113. Mounting springs 110 and 111 extend upwardly from base 105 of suspension cradle 100 and diverge in the upward direction and are attached to mounting pins 50 and 51 at their upper ends. Mounting springs 110 and 111 are housed in telescoping tubular cylinders. Mounting pins 50 and 51 extend through the upper ends of C-shaped arms 30 and 31 and also extend into the first portion 61 of drive means 60 and second portion 62 of drive means 60. Therefore, mounting pins 50 and 51 carry the entire weight of C-shaped arms 30 and 31 as well as the weight of drive means 60. This weight is transferred to suspension cradle 100 through mounting springs 110 and 111 which tends to isolate vibrations in picking head 20 from frame 11 of the harvester.

Figure 3:
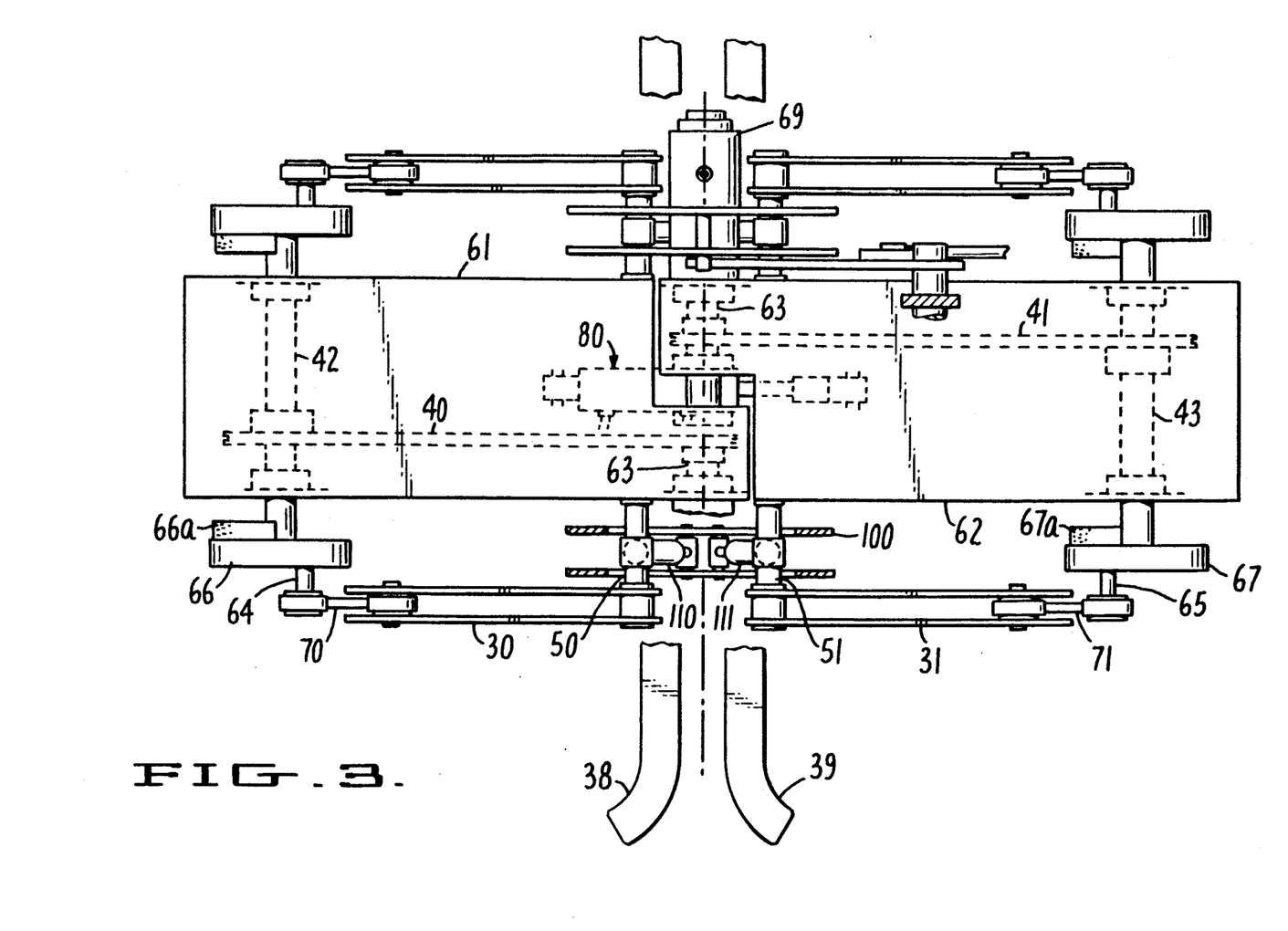
FIG. 3 is a top elevation on the line 3—3 of FIG. 2.

As shown best in FIG. 2, the weight of drive means 60 is carried by mounting pins 50 and 51. The two portions 61 and 62 of drive means 60 are free to pivot around drive shaft 63 which is carried between mounting pins 50 and 51. As shown in FIG. 3, portion 61 of drive means 60 is a chain drive housing which houses drive chain 40 and portion 62 comprises a chain drive housing which houses chain 41. Chain drive housing 62 comprises a generally rectangular housing which at one extreme carries drive shaft 63 and at its outboard end carries shaft 43 which supports flywheel 67 and crank 65. Similarly, portion 61 comprises a rectangular chain drive housing which carries at its inner extreme a portion of drive shaft 63 and at its outboard end shaft 42 which carries flywheel 66 and crank 64. Balancing weight 66a is carried by flywheel 66 and balancing weight 67a is carried by flywheel 67 to reduce vibrations otherwise caused by cranks 64 and 65. Hydraulic drive motor 69 is mounted at the rear end of drive shaft 63. Motor 69 drives shaft 63 and through chains 40 and 41 also drives shafts 42 and 43 which cause flywheels 66 and 67 to rotate. The back half of the picking head has a second set of arms, similar to arms 30 and 31, and a similar set of drive flywheels and connecting rods as well as a second suspension cradle, which have not been separately labeled for clarity.

The picking head of the present invention operates more efficiently than the picking heads of the prior art. By allowing each of the C-shaped arms 30 and 31 to move independently of the other and by utilizing a large throw crank drive for each supporting arm, non-sinusoidal accelerations are achieved for shaker rails 38 and 39 wherein the driving rail on each half portion of the stroke cycle achieves a substantially greater (i.e. more than 30%) acceleration than it achieves in its non-driving half portion of the cycle. When the driving rail has achieved its maximum acceleration, it imparts a snapping or jerking action to the grapevine which maximizes the grape removal efficiency. As the driving rail reaches the extreme portion of its stroke, it "hands off" the vine to the outside rail which is moving at a substantially lower rate of acceleration (i.e. at least 30% less than the driving rail). Therefore, after the vine has been snapped or jerked, it is then passed to the other rail with a "soft handoff." The other rail receiving the vine accelerates slowly at first and then, as it moves into the latter portion of its driving cycle, its acceleration increases to again achieve maximum acceleration at the end of its driving portion of the cycle. Again, after imparting its snap or jerk to the vine, the vine is again handed off softly to the non-driving or outside rail. In this fashion, a maximum snapping motion is imparted to the vine with minimum damage to the vine and supporting stakes. This allows the machine of the present invention to be operated at higher ground speeds than machines of the prior art without any loss of picking efficiency or any increase of vine or stake damage.

What is claimed is:

1. In a harvesting machine having a wheeled main frame adapted to straddle and move along a row of plants which have vertical trunks spaced along the row, wherein a pair of shaker rails is oscillated between two extreme positions to alternately impact the sides of said trunks, the improvement comprising:
    a pair of downwardly depending arms, each of said arms being pivotally suspended at its upper end whereby each arm is free to pivot independently of the other arm,
    a shaker rail carried at the lower end of each of said arms,
    drive means comprising a reaction mass and a pair of cranks carried by said reaction mass, said drive means further comprising a pair of connecting rods extending from said cranks to said arms, wherein the throw of each crank is more than 20% of the length of each connecting rod, and
    wherein as said drive means oscillates said arms, relative motion occurs between said shaker rails such that the distance between shaker rails is less at each extreme position than at dead center, said relative motion causing a snapping action at each extreme position.

2. The apparatus of claim 1 wherein said reaction mass forms an inverted V shape, and wherein said reaction mass comprises two portions pivotally joined at the apex of said inverted V, and further comprising
    a pressure cylinder connected to each portion of said reaction mass, said cylinder being pressurized to the point where said cylinder equalizes the weight of said reaction mass and shaker rails
    whereby the distance between said shaker rails is automatically adjusted as said harvesting machine moves along said row of plants.

3. The apparatus of claim 1 wherein the maximum acceleration of each shaker rail occurs at an extreme position of said shaker rail, and wherein the acceleration of each shaker rail is at least 30% greater at one extreme position than at the other extreme, whereby a snapping action is imparted to said trunks at the point of maximum shaker rail acceleration, and whereby a soft handoff of said trunks is made from said one rail to the other rail immediately after said one rail reaches its maximum acceleration.

4. A picking head for a harvesting machine having a wheeled main frame adapted to straddle and move along a row of plants which have vertical trunks spaced along the row, said picking head comprising:
    a suspension cradle pivotally attached to said harvester frame,
    a pair of C-shaped arms, each pivotally suspended at its upper end from said suspension cradle, said arms being suspended symmetrically about a vertical plane extending between said arms, drive means suspended from said suspension cradle and comprising a pair of flywheels, each of said flywheels being mounted above and outboard of the center of each of said C-shaped arms, each of said flywheels carrying a crank and having a connecting rod extending from said crank to the center portion of one of said C-shaped arms, as said drive means oscillates said C-saped arms, relative motion occurs between the lower ends of said C-shaped arms wherein the distance between the lower ends of said C-shaped arms is less at each extreme position than at dead center, said relative motion causing a snapping action at each extreme position.

5. The apparatus of claim 4 wherein said drive means is carried in a drive chain housing, further comprising:
a pair of mounting pins, each of said pins extending through the upper end of one of said C-shaped arms, whereby each of said C-shaped arms is free to pivot about said mounting pin independently of the other C-shaped arm; each of said pins extending into said drive chain housing, whereby the weight of said drive means and said C-shaped arms is carried by said mounting pins, and
a pair of mounting springs mounted between said mounting pins and said suspension cradle, whereby the weight of said drive means and said C-shaped arms is transferred from said pins to said suspension cradle through said mounting springs.

6. The apparatus of claim 5 wherein said mounting springs extend upwardly from said suspension cradle and said springs diverge in an upward direction, and further comprising a drive shaft for said drive means located between said mounting pins, said drive shaft being connected to said flywheels by drive chains, and wherein said drive means forms a reaction mass against which said C-shaped arms are driven.

7. The apparatus of claim 4 wherein the throw of each of said cranks is more than 20% of the length of said connecting rods.

* * * * *